(12) United States Patent
Hiramatsu

(10) Patent No.: US 6,829,394 B2
(45) Date of Patent: Dec. 7, 2004

(54) SYSTEM AND METHOD OF POINTED POSITION DETECTION, PRESENTATION SYSTEM, AND PROGRAM

(75) Inventor: Kazunori Hiramatsu, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 610 days.

(21) Appl. No.: 09/788,578

(22) Filed: Feb. 21, 2001

(65) Prior Publication Data

US 2001/0022861 A1 Sep. 20, 2001

(30) Foreign Application Priority Data

Feb. 22, 2000 (JP) ........................................ 2000-043781

(51) Int. Cl.[7] .............................. G06K 9/36; G09G 5/08
(52) U.S. Cl. ....................................... 382/291; 345/157
(58) Field of Search ................................ 382/181, 254, 382/255, 260, 293, 291, 299; 345/2.2, 156, 157, 661, 705; 348/207.99, 211.99, 220.1, 221.1; 356/614

(56) References Cited

U.S. PATENT DOCUMENTS

| | | | |
|---|---|---|---|
| 5,528,263 A | | 6/1996 | Platzker et al. |
| 5,572,251 A | * | 11/1996 | Ogawa .................. 348/207.99 |
| 5,687,333 A | * | 11/1997 | Dobashi et al. ............. 345/705 |
| 5,726,701 A | * | 3/1998 | Needham .................... 725/105 |
| 5,736,968 A | * | 4/1998 | Tsakiris ....................... 345/2.2 |
| 5,815,160 A | * | 9/1998 | Kikuchi et al. ............. 345/661 |
| 5,914,783 A | * | 6/1999 | Barrus ........................ 356/614 |
| 6,292,171 B1 | * | 9/2001 | Fu et al. ..................... 345/156 |

FOREIGN PATENT DOCUMENTS

| | | |
|---|---|---|
| JP | A 8-179875 | 7/1996 |
| JP | A 8-320921 | 12/1996 |
| JP | A 11-24839 | 1/1999 |
| JP | 11-345085 | 12/1999 |
| JP | 11-345086 | 12/1999 |
| WO | WO 95/34881 | 12/1995 |

OTHER PUBLICATIONS

U.S. patent application Ser. No. 09/788,605, Hiramatsu, filed Feb. 21, 2001.
U.S. patent application Ser. No. 09/788,740, Kitazawa, filed Feb. 8, 2001.

* cited by examiner

Primary Examiner—Bhavesh M Mehta
Assistant Examiner—Kanji Patel
(74) Attorney, Agent, or Firm—Oliff & Berridge, PLC

(57) ABSTRACT

A system and method of pointed position detection, a presentation system, and a program for accurately detecting a pointed position based on an infrared image or the like. The configuration comprises a CCD camera for taking an image of an image display region, and a processing section that functions as a position detection means which detects a pointed position of a pointing image within an image display region that has been formed by infrared light through an optical filter that passes only infrared light. A movement magnitude computation section within the processing section detects movement of a pointer implement, based on the infrared image that was formed by infrared light and taken by the CCD camera, and a pointing coordinate detection section detects the pointed position of that pointing image in a state in which movement of the pointer implement is halted.

16 Claims, 12 Drawing Sheets

SYSTEM AND METHOD OF POINTED POSITION DETECTION, PRESENTATION SYSTEM, AND PROGRAM

BACKGROUND OF THE INVENTION

1. Field of the Invention

The present invention relates to a system and method of pointed position detection, a presentation system, and also a program.

2. Description of Related Art

In a presentation system that makes use of a projector or the like, it is necessary to detect the position of a pointer implemented by a pointer implement. In such a case, it is important to accurately detect the pointed position without having to use a special pointer implement or the like.

Various techniques are being investigated, such as one in which auxiliary illumination such as infrared light is used, the shadow of a pointer implement that is cast by this infrared light is imaged by a CCD camera or the like, and detection of the position of this pointer is based on an imaging signal therefrom. A particular problem in such a case concerns the low detection sensitivity with respect to an image formed by infrared light that is taken by the CCD camera. A CCD camera has a narrower dynamic range for infrared light than for usual visible light. It is therefore unable to pick up an infrared image efficiently. This is considered to be one cause leading to the reduction in position detection accuracy.

SUMMARY OF THE INVENTION

The present invention was devised in the light of the above described technical problem and has as an objective thereof the provision of a system and method of pointed position detection, a presentation system, and also a program for accurate pointed position detection based on an infrared image or the like.

(1) In order to solve the above described technical problem, a pointed position detection system in accordance with the present invention comprises:

image pick-up means which picks up an image of an image display region; and position detection means which detects a position that is pointed by a pointing image within the image display region, based on image information obtained by the image pick-up means;

wherein the position detection means comprises:

movement detection means which detects movement of the pointing image; and pointed position detection means which detects the pointed position of the pointing image when movement of the pointing image has halted.

(2) According to the present invention, there is provided a pointed position detection system comprising:

image pick-up section which picks up an image of an image display region; and position detection section which detects a position that is pointed by a pointing image within the image display region, based on image information obtained by the image pick-up section;

wherein the position detection section comprises:

movement detection section which detects movement of the pointing image; and pointed position detection section which detects the pointed position of the pointing image when movement of the pointing image has halted.

(3) A presentation system in accordance with the present invention comprises display means which display an image in the image display region, and the above-described pointed position detection system to detect the pointed position of the pointing image.

(4) According to the present invention, there is provided a computer-usable program for implementing a presentation system, the program that is embodied on an information storage medium or in a carrier wave, further implementing on a computer:

means for causing image pick-up means to pick up an image of an image display region; and position detection means which detects a position that is pointed by a pointing image within the image display region, based on image information obtained by the image pick-up means;

wherein the position detection means comprises:

movement detection means which detects movement of the pointing image; and pointed position detection means which detects the pointed position of the pointing image when movement of the pointing image has halted.

(5) A pointed position detection method in accordance with the present invention comprises:

an image picking-up step of picking up an image of an image display region; and a position detection step of detecting a position that is pointed by a pointing image within the image display region, based on image information obtained in the image picking-up step;

wherein the position detection step comprises:

a step of detecting movement of the pointing image; and a step of detecting the pointed position of the pointing image when movement of the pointing image has halted.

This aspect of the present invention makes it possible to perform accurate position detection by boosting the S/N ratio of the captured image, even if it is assumed that the image pick-up means has a bad S/N ratio, by using a configuration by which movement of the pointing image is detected and a still image of the pointing image is captured after confirmation that the movement has halted, then pointed position detection is based on the captured still image.

(6) In each of the above pointed position detection system, presentation system, and program, the image pick-up means may pick up an infrared image of the image display region which is formed by infrared light;

the movement detection means may detect movement of the pointing image based on the infrared image formed by infrared light; and the pointed position detection means may detect the pointed position of the pointing image based on the infrared image formed by infrared light.

This makes it possible to separate the projected background image and the pointing image efficiently, thus enabling efficient movement detection with a simple configuration, when the light for an image is projected from the projector onto the image display region, by way of example.

It also makes it possible to perform position detection based on an infrared image without using any special means, thus simplifying the system configuration.

Note that infrared light generally ranges in wave-length from 700 nm to 1 mm.

(7) In each of the pointed position detection system, presentation system, and program, the image pick-up means may pick up an infrared image of the image display region formed by infrared light and a visible-light image of the image display region formed by visible light;

the movement detection means may detect movement of the pointing image based on the infrared image formed by infrared light; and the pointed position detection means may detect the pointed position of the pointing image based on the visible-light image formed by visible light.

This makes it possible to separate the projected background image and the pointing image efficiently, thus enabling efficient movement detection with a simple configuration.

In such a case, it is preferable to provide switching between a filter for visible light and a filter for infrared light, in the light path in front of the image pick-up means.

More specifically, a shutter configuration could be enabled or infrared and visible-light filters could be provided to cover the two halves of a circular filter mechanism, where the mechanism is switched by a motor drive.

If the image pick-up means is implemented by a CCD camera, by way of example, this aspect of the invention makes it possible to provide imaging by a single CCD camera, instead of a plurality of CCD cameras for taking images formed by visible light and infrared light.

This capturing of a still image as an image formed by visible light during position detection enables an increase in the dynamic range of the thus-captured image, thus making it possible to achieve accurate position detection that is not affected by ambient noise around the pointing image.

Note that the visible light generally ranges in wavelength from 400 nm to 700 nm.

(8) In each of the above pointed position detection system, presentation system, and program, the image pick-up means may pick up an infrared image of the image display region formed by infrared light and a visible-light image of the image display region formed by visible light;

the movement detection means may detect movement of the pointing image based on the visible-light image formed by visible light; and the pointed position detection means may detect the pointed position of the pointing image based on the infrared image formed by infrared light.

In such a case, the above described method ensures a reduction in ambient noise and accurate position detection, by enabling imaging while the light is switched between visible light and infrared light, and also by taking an infrared image as a still image.

(9) In each of the above pointed position detection system and presentation system, the image pick-up means may pick up an image formed by infrared light, through an infrared transmission section that allows only infrared light to pass.

This ensures accurate position detection by removing unnecessary light components to reduce noise, by taking an infrared image through the infrared transmission section.

(10) Each of the pointed position detection system and presentation system may further comprise an auxiliary light source which projects infrared light towards the image display region when picking up an image formed by infrared light.

This provision of an auxiliary light source ensures that an infrared image is picked up even in locations where there is no sunlight.

(11) In each of the pointed position detection system and presentation system, the image pick-up means may includes adjusting means which adjusts exposure time such that an image is taken with a predetermined short exposure time during the detection of movement of the pointing image, but an image is taken with a long exposure time that is longer than the short exposure time during the detection of the pointed position of the pointing image.

(12) The program may further comprise information for implementing adjusting means which adjusts exposure time such that an image is taken with a predetermined short exposure time during the detection of movement of the pointing image, but an image is taken with a long exposure time that is longer than the short exposure time during the detection of the pointed position of the pointing image.

This makes it possible to obtain an image with a high S/N ratio, which is necessary for position detection, by lengthening the exposure time, thus ensuring accurate position detection. When position detection is done by using infrared light, the sensitivity of a CCD camera for infrared light is less than that for visible light, so that use of this method ensures a sufficiently large dynamic range even when infrared light is used for position detection, ensuring accurate position detection.

(13) The pointed position detection system may further comprise projection means which projects light for forming a uniform image towards the image display region during the detection of the pointed position of the pointing image.

(14) In the above presentation system, the display means may displays a uniform image during the detection of the pointed position of the pointing image.

(15) The program may further implement on a computer, projection means which projects light for forming a uniform image towards the image display region during the detection of the pointed position of the pointing image.

This ensures that no background intrudes into the thus-captured image and also that only the pointing image is captured, thus making it possible to detect the pointed position thereof accurately.

Note that, in this case, a uniform image is preferably a flash image that is displayed for an instant.

(16) Each of the pointed position detection system and presentation system may further comprise processing means which performs predetermined determination processing when a halt of movement of the pointing image is detected for at least a predetermined time, based on a detection result of the pointed position detection means.

(17) The program may further implement on a computer, processing means which performs predetermined determination processing when a halt of movement of the pointing image is detected for at least a predetermined time, based on a detection result of the pointed position detection means.

This enables determination of the pointed position.

In this case, means for executing a predetermined program when a halt of movement of the pointing image is detected for at least a predetermined time could be applied as the processing means which performs the predetermined determination processing.

(18) In each of the pointed position detection system, presentation system, and program, the processing means which performs predetermined determination processing may comprise:

changing means which changes a display of the pointing region when a pointer implement is halted for less than the predetermined time; and processing means which performs the determination processing when the halting of the pointer implement continues after the display change of the pointing region.

This makes it possible that selection of an icon displayed in the image display region can be visually conveyed to the presenter by changing the display state of the icon after clicking of the icon, by way of example, thus making it possible to prevent erroneous operation and give the presenter a more enhanced operating experience.

DETAILED DESCRIPTION OF THE PREFERRED EMBODIMENTS

Preferred embodiments of the present invention, in which it is applied to a system for determining a pointed position in a presentation system, EW described below with reference to the accompanying figures.

Figure 1:
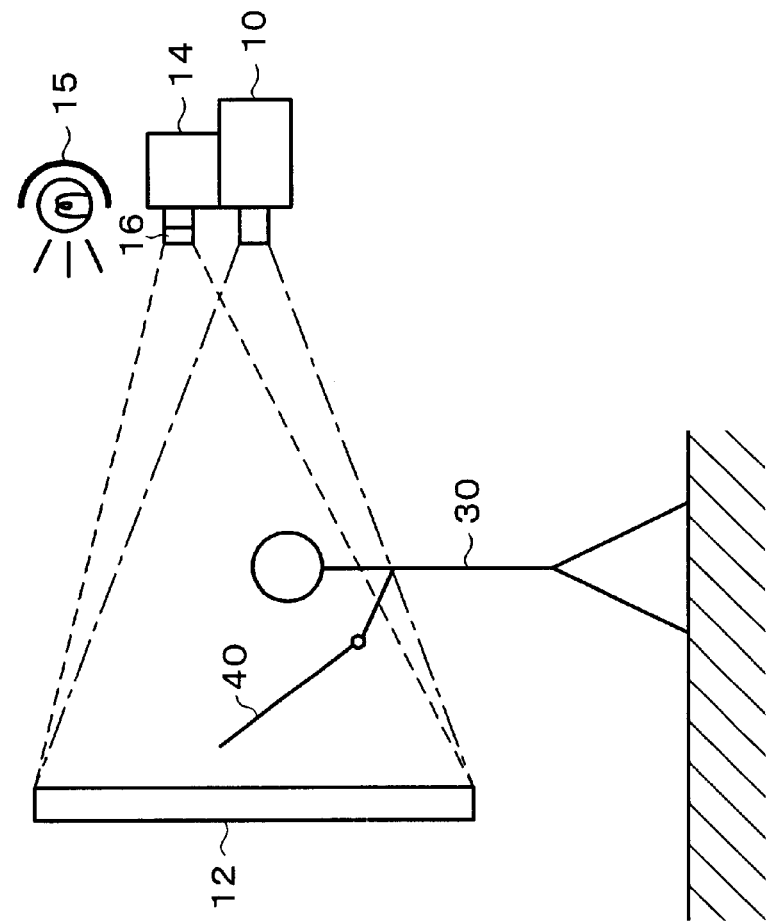
FIG. 1 is a schematic view of a presentation system of a typical embodiment of the present invention.

A schematic view of the presentation system in accordance with an example of this embodiment of the present invention is shown in FIG. 1.

A projector 10 that is provided substantially facing a screen projects an image for a predetermined presentation. A presenter 30 gives a presentation to an audience while using a pointer rod 40 to point to a region that is displayed on the screen, in other words, to a desired position the image of the image display region 12.

In a state in which the presenter 30 is using the pointer rod 40 to indicate a desired position in the image display region 12 on the screen, a CCD camera 14 which functions as an image pick-up means and which is provided substantially facing the image display region 12 picks up an image of the image display region 12, part of the presenter 30, and the pointer rod 40, as a pointing image.

In this case, a long, thin, rod-shaped shadow that is cast by the pointer rod 40 within the light that is projected from the projector 10 is called a shadow region of the pointing image. The actual image of the part of the presenter 30 and the pointer rod 40 that appears within the picked-up image is called the actual image region of the pointing image, and all this information (these targets) used in the detection processing of the pointed position is combined for detection.

The projector 10 detects the pointed position on the image display region 12, which is indicated by the presenter 30 using the shadow region of the pointer rod 40, as the tip position of the shadow region of the pointing image projected onto the image display region 12 within the picked-up image. In other words, the tip position of the shadow region of the rod-shaped pointing image is automatically detected as the pointed position and is subjected to predetermined data processing.

In a similar manner, the pointed position indicated on the image display region 12 by the presenter 30 using the actual image region of the pointer rod 40 is detected as the tip position of the actual image region of the pointing image projected onto the image display region 12 within the picked-up image.

This embodiment of the present invention is provided with an infrared light source 15 and an optical filter 16 provided at the end of the CCD camera 14, as necessary. The optical filter 16 is, to be more specific, an infrared-transmission filter that passes only infrared light.

In this system, the CCD camera 14 that is the image pick-up means takes an image of the image display region 12 by infrared light, through the optical filter 16, and detects movement of the pointer rod 40 from the thus-captured pointing image. The projector 10 captures a still image of the pointing image in a state in which movement of the pointer rod 40 has halted and determines the pointed position of the pointer rod 40, based on the thus-captured pointing image.

To form an infrared image, the infrared light source 15 is provided as an auxiliary light source. If the presentation were to be given in a location where there is sufficient sunlight (natural light), it will not always be necessary to provide the infrared light source 15 because sunlight comprises infrared rays. However, the provision of the infrared light source 15 makes it possible to form a desired infrared image more reliably, particularly in dark locations where sunlight does not enter.

The effects described below can be achieved by the system configured as above. First of all, the detection of movement of the pointer rod 40 or the like by infrared light makes it possible to detect the pointed position accurately, reducing the effects of the projected light which is visible light.

In addition, since the sensitivity of the CCD camera 14 is less when infrared light is employed, in comparison with visible light, a problem occurs in that the S/N ratio is low and the dynamic range is narrow. This embodiment of the present invention, however, makes it possible to increase the dynamic range and achieve accurate position detection, by lowering the frame rate of the CCD camera 14 in a state in which movement is halted.

The description now turns to function blocks for implementing the system as described above.

Figure 2:
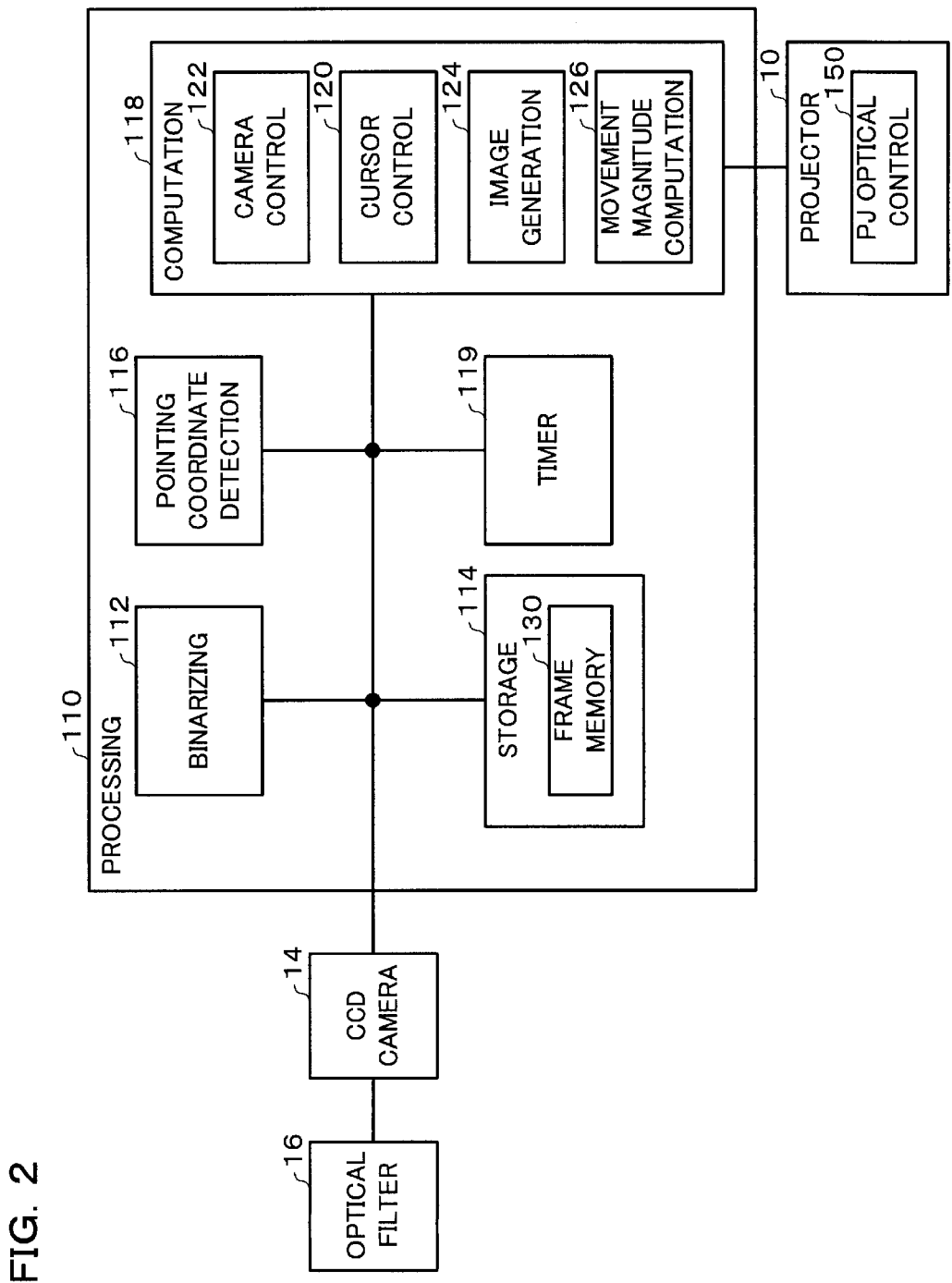
FIG. 2 is a functional block diagram of a system in accordance with an example of this embodiment of the present invention.

A functional block diagram of a system in accordance with an example of this embodiment of the invention is shown in FIG. 2.

A processing section 110 comprises a binarizing section 112, a pointing coordinate detection section 116, a computation section 118, and a storage section 114. The thus configured processing section 110 is specifically implemented by using components such as a CPU, a ROM that is an information storage medium for storing various programs and data, and a RAM that functions as a work area.

An image signal that is output from the CCD camera 14 is input to the binarizing section 112. In this embodiment of the invention, it is assumed that the CCD camera 14 outputs a monochrome image signal.

In this embodiment of the invention, the binarizing section 112 compares the image signal and a predetermined reference value Vref, and extracts the detection target such as the shadow or the actual image of the pointing image from the thus captured image. The pointing coordinate detection section 116 functions as position detection means for detecting the pointed position.

The binarizing section 112 compares brightness data of the image signal that is output from the CCD camera 14 with the reference value Vref, performs processing to extract the detection target of the pointing image from the image taken by the CCD camera 14, then outputs the thus processed data to the pointing coordinate detection section 116 as digital image data.

The pointing coordinate detection section 116 extracts the bulk of the detection target from the digital image data that is output from the binarizing section 112, detects the tip portion of that detection target as the coordinates indicated by the pointer rod 40, then outputs that detection result to the computation section 118.

The pointing coordinate detection section 116 is configured to specify the pointing image, based on the continuity of the image of the detection target that extends in a rod-shaped form, then detect the tip portion thereof as the pointing coordinates. This makes it possible detect the pointed position with a higher level of precision than when a corner of the detection target image is simply detected as the pointing coordinates.

The computation section 118 performs various types of data processing and image processing based on the detection data of the thus-input pointed position.

In this embodiment of the present invention, the computation section 118 functions as a camera control section 122, a cursor control section 120, an image generation section 124, and a movement magnitude computation section 126.

The camera control section 122 performs various types of optical control such as focus control for the CCD camera 14, based on information that is input from a projector (PJ) optical control section 150.

The cursor control section 120 performs position control for an arrow-shaped cursor that is projected for display in the image display region 12 in such a manner that it indicates the detected pointed position. In other words, the cursor control section 120 controls the image generation section 124 in such a manner that a cursor that is comprised within the image projected from the projector 10 moves to follow the pointed position of the pointer rod 40.

The cursor control section 120 also performs position control to ensure that the cursor indicates the detected pointed position at a position that does not overlay the shadow region of the pointing image.

The description now turns to pointed position detection processing using the above components.

Figure 3:
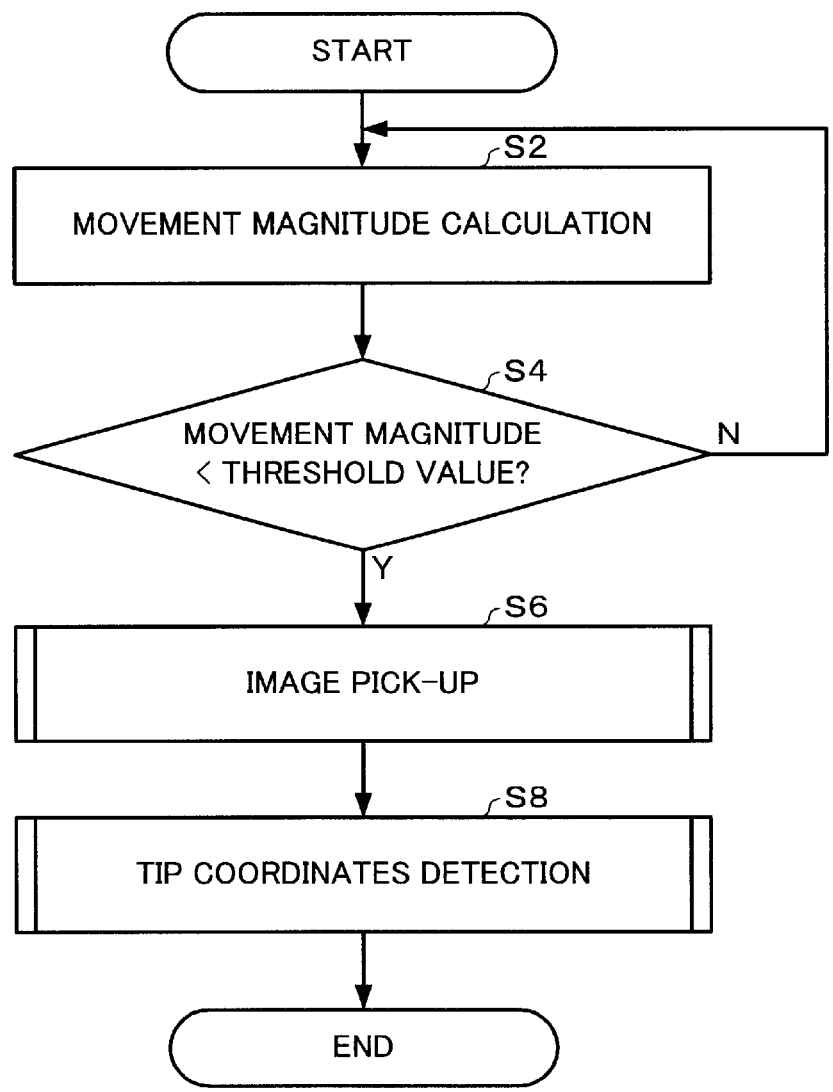
FIG. 3 is a flowchart of pointed position detection processing in accordance with an example of this embodiment of the present invention.

A flowchart of the pointed position detection processing in accordance with an example of this embodiment of the present invention is shown in FIG. 3.

The magnitude of movement of the pointer rod 40 is calculated by the movement magnitude computation section 126 from a pointing image that has been picked up by the CCD camera 14 and a pointing image for the previous frame, which has been stored in a frame memory 130 (step S2). More specifically, the magnitude of movement is calculated as the number of pixels of a differential image between the pointing image that has just been taken by the CCD camera 14 and the pointing image for the previous frame which is stored in the frame memory 130.

The computation section 118 determines whether or not the magnitude of movement has exceeded a threshold value (step S4). If the computation section 118 determines that the magnitude of movement has not exceeded the threshold value, it judges that the movement of the pointer rod 40 has halted and instructs image pick-up (step S6). In other words, the processing section 110 picks up an image in a state that it is a still image, not a moving image.

After the image pick-up, the processing section 110 detects the coordinates of the tip of the pointer rod 40 (step S8).

The image pick-up processing (step S6) and tip coordinates detection processing (step S8) are described below in sequence.

Figure 4:
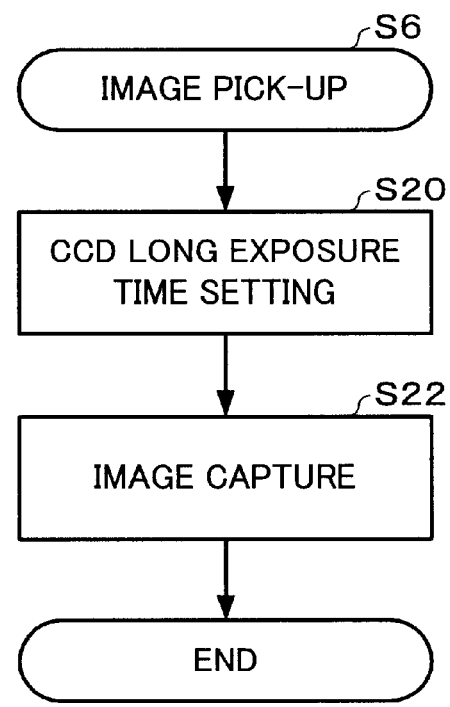
FIG. 4 is a flowchart of image capture processing in accordance with an example of this embodiment of the present invention.

A flowchart of the image capture processing in accordance with an example of this embodiment of the present invention is shown in FIG. 4.

In the image pick-up processing (step S6), the CCD is first set to a long exposure time in order to take an image as a still image (step S20). More specifically, the camera control section 122 send a control signal to the CCD camera 14 to increase the exposure time.

The CCD camera 14 comprises a timing generator for adjusting the frame rate and a driver for driving the CCD. The frame rate of the timing generator is delayed by this control signal, which causes the driver to adjust the CCD to have a long exposure time. More specifically, the usual frame rate is on the order of 30 frames/second (fps) but it is adjusted to 10 fps, one-third of that speed, for position detection.

The CCD camera 14 therefore picks up an image in a state in which it has been set to an exposure time that is longer than usual. The processing section 110 captures the picked-up image (step S22).

This makes it possible to acquire an image with a large S/H ratio, which is necessary for position detection, thus enabling accurate position detection. When position detection is done by using infrared light in particular, the sensitivity of the CCD camera for infrared light is less than that for visible light. Use of this method therefore ensures a sufficiently large dynamic range even when infrared light is used for position detection, ensuring accurate position detection.

After the image capture, the processing section 110 then proceeds to tip coordinates detection processing (step S8).

Figure 5:
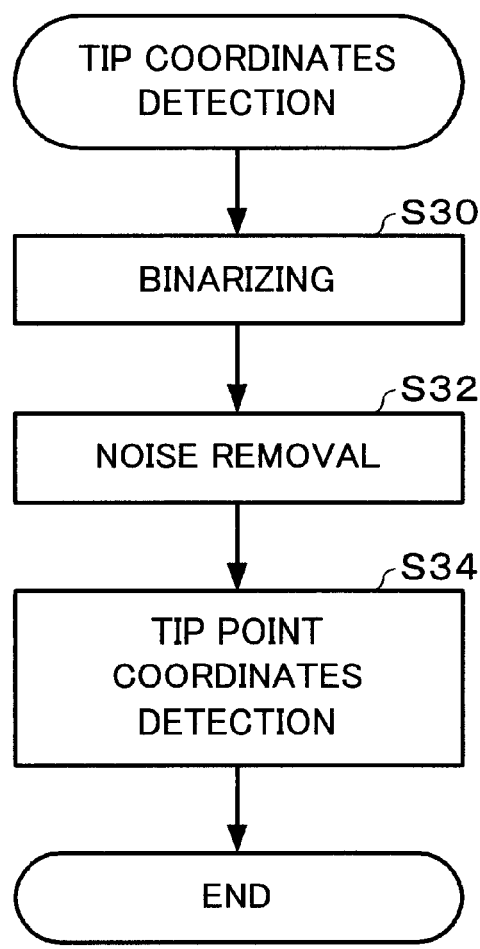
FIG. 5 is a flowchart of tip coordinates detection processing in accordance with an example of this embodiment of the present invention.

A flowchart of tip coordinates detection processing in accordance with an example of this embodiment of the present invention is shown in FIG. 5. Illustrative views of the state of images up until the tip coordinates are detected by this embodiment of the invention are shown in FIGS. 6A to 6D, with FIG. 6A showing the state of the original image, FIG. 6B showing the state after binarization, FIG. 6C showing the state after noise removal, and FIG. 6D showing the state after the coordinates of the tip point have been detected.

Figure 6A:
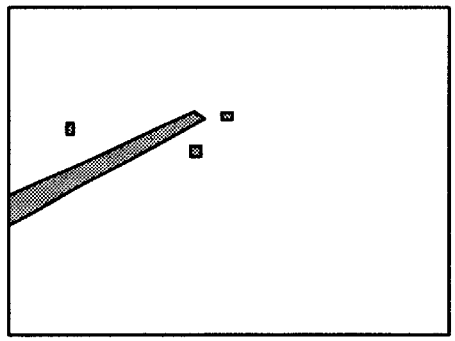
FIG. 6A shows the state of the original image.
Figure 6B:
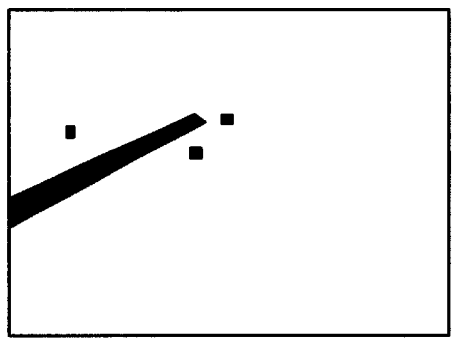
FIG. 6B shows the state after binarization.
Figure 6C:
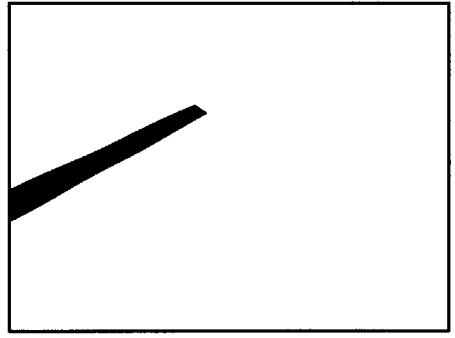
FIG. 6C shows the state after noise removal.

The binarizing section 112 performs binarizing on the original captured image, as shown in FIG. 6A (step S30). This produces the image shown in FIG. 6B as the post-binarized image.

Noise is then removed by a low-pass filter comprised within the pointing coordinate detection section 116 (step S32). This produces the image shown in FIG. 6C as a noise-free image.

Figure 6D:
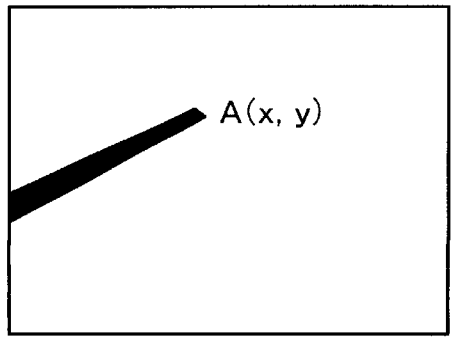
FIG. 6D shows the state after the coordinates of the tip point have been detected.

The pointing coordinate detection section 116 detects the coordinates of the tip point (such as (x, y) in FIG. 6D) from this noise-free state (step S34).

The tip, in other words, the pointed position, is thereby detected. After the pointed position has been detected, the processing section 110 performs processing to determine the position indication.

Note that further details such as those of the above described binarizing and the tip detection processing are disclosed in the patent literature (Japanese Patent Application Laid-Open No. 11-345085) by the present applicants, so further description thereof is omitted.

The description now turns to the processing for determining the position indication.

Figure 7:
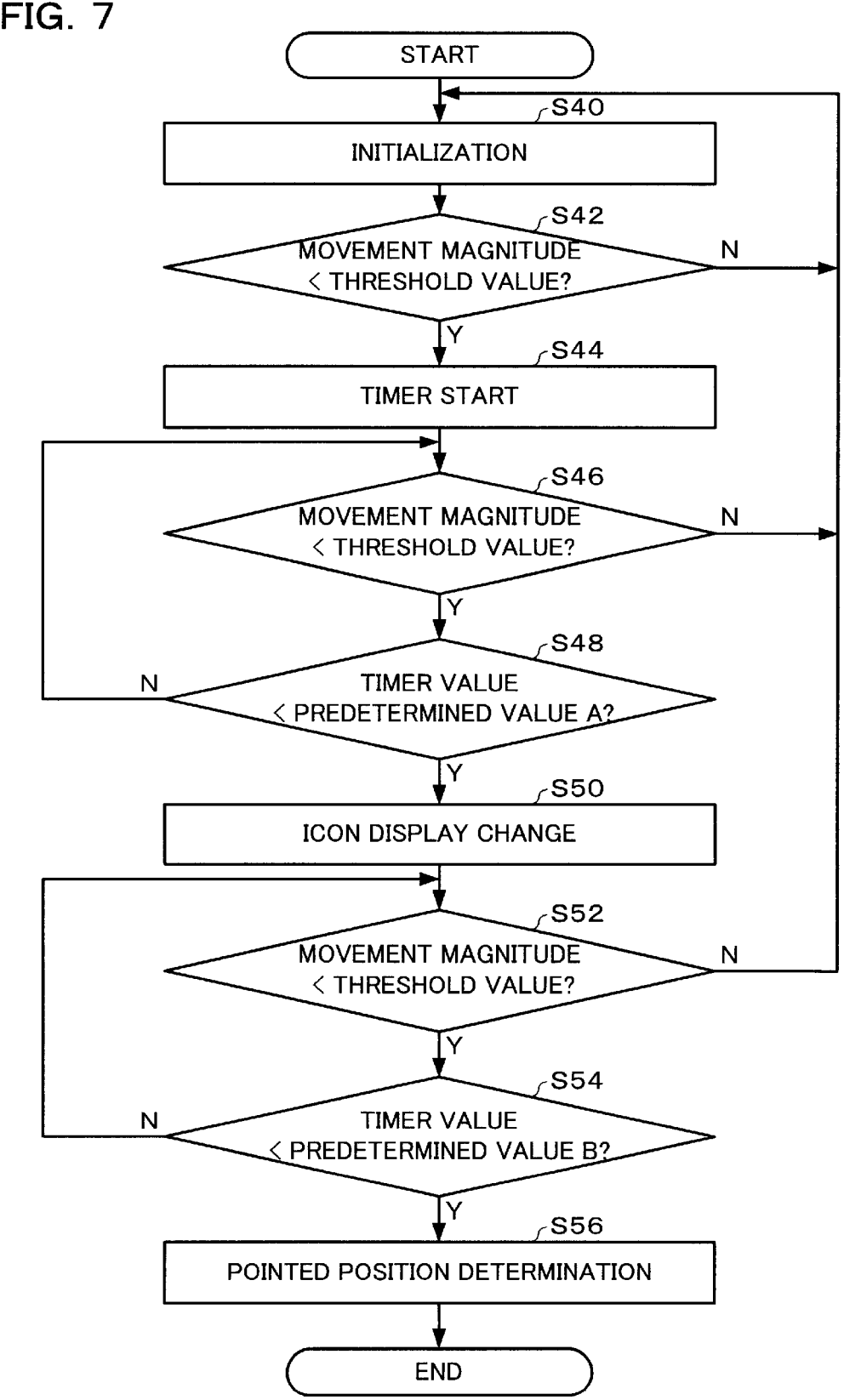
FIG. 7 is a flowchart of pointed position determination processing in accordance with an example of this embodiment of the present invention.

A flowchart of the pointed position determination processing in accordance with an example of this embodiment of the present invention is shown in FIG. 7.

Components such as a timer section 119 comprised within the processing section 110 perform various initialization processes, such as resetting a timer (step S40).

The computation section 118 determines whether or not the magnitude of movement has exceeded a threshold value (step S42). If the computation section 118 determines that the magnitude of movement has not exceeded the threshold value, it judges that the movement of the pointer rod 40 has halted and activates the timer of the timer section 119 (step S44).

Even after timer activation (step S44), the computation section 118 continues to determine whether or not the magnitude of movement has exceeded the threshold value, in other words, it determines whether or not the pointer rod 40 has remained halted (step S46).

The timer initially set to 0 by the initialization processing (step S40). While the pointer rod 40 remains halted as determined by the computation section 118, the timer section 119 increments the value of the timer as time elapses.

At the point at which the value of the timer exceeds a predetermined value A (such as a value indicating one second), in other words, at the point at which it is determined that the pointer rod 40 has remained halted for the predetermined time A (step 48), the processing section 110 changes the display of an icon (step S50).

Figure 8A:
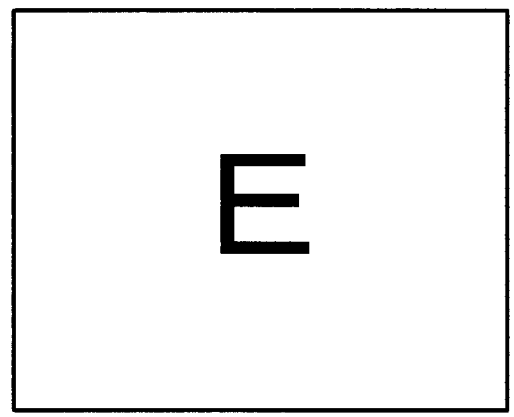
FIG. 8A is a schematic view showing the state of the icon before pointed position determination and FIG. 8B is a schematic view showing the state thereof during pointed position determination.
Figure 8B:
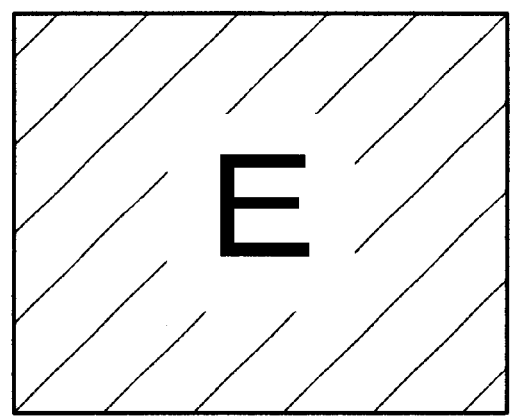

Schematic views of the state of an icon during the pointed position determination in accordance with an example of this embodiment of the present invention are shown in FIGS. 8A and 8B, with FIG. 8A showing the state of the icon before pointed position determination and FIG. 8B showing the state thereof after pointed position determination.

In this case, assume that the presenter 30 uses the pointer rod 40 to point to an icon as shown in FIG. 8A, and activates an application that is associated with that icon by pointing to that icon continuously for a predetermined time.

If the movement of the pointer rod 40 is less than the threshold value when it is pointing to the icon shown in FIG. 8A, the display of the icon changes when a predetermined time has elapsed, to a state in which the background of the icon is highlighted, as shown in FIG. 8B.

More specifically, an image that changes the display of the icon is generated by the image generation section 124 and the post-change image is projected from the projector 10.

This change in the way in which the icon indicated by the pointer rod 40 is displayed makes it possible for the presenter 30 to be aware of the pointing operation, even if the presenter 30 makes a mistake in the pointing operation, thus making it possible to prevent erroneous operation.

Even after the icon display change (step S50), the computation section 118 continues to determine whether or not the magnitude of movement has exceeded the threshold value, in other words, it determines whether or not the pointer rod 40 has remained halted (step S52).

At the point at which the value of the timer exceeds another predetermined value B (such as a value indicating two seconds), in other words, at the point at which it is determined that the pointer rod 40 has remained halted for that predetermined after the icon display change (step S50), the processing section 110 performs pointed position determination processing (step S56).

More specifically, the processing section 110 activates the application that is associated with that icon, as specified by the pointed position determination (step S56).

This makes it possible to perform operations similar to clicking or double-clicking with the pointer rod 40 or a finger, even when the presenter is not pointing with a pointer implement that has a switch or button, such as a mouse.

Note that the computation section 118 does not determine the pointed position of the pointer rod 40 if the magnitude of movement exceeds the threshold value during the determination by the computation section 118 as to whether or not the pointer rod 40 has remained halted (steps S46 and S52), in other words, if it is determined that the pointer rod 40 has moved. As a result, the processing is repeated from the initialization of the timer (step S40).

This embodiment of the present invention as described above makes it possible to detect the pointed position from a still image, by taking the pointing image at the point at which the movement of the pointer rod 40 has halted. This enables accurate position detection by increasing the S/N ratio of the image itself, which is taken as a still image, even if the CCD camera 14 is assumed to have a bad S/N ratio.

When the light for an image is projected from the projector 10 to the image display region 12, it is possible to separate the projected background image and the pointing image efficiently, thus enabling efficient movement detection with a simple configuration.

This enables a simplification of a system configuration that can detect a position from an infrared image, without having to use special means.

A sufficiently large dynamic range can be obtained by lowering the frame rate at which the CCD camera 14 picks up images, thus lengthening the exposure time, even when infrared light is used for position detection, thus ensuring accurate position detection.

The present invention has been described above with reference to a specific embodiment thereof but it should be noted that the application of the present invention is not limited to that specific embodiment.

For example, infrared light is used in the above described specific embodiment for detecting movement of the pointer rod 40 and the pointed position, but it is also possible to use infrared light for the movement detection and visible light for the pointed position detection, or visible light for the movement detection and infrared light for the pointed position detection. It is also possible to detect movement even with an image signal from a means that forms an image of normal visible light, by employing a template comparison method for the above described movement detection.

The description now turns to an example in which infrared light is used for movement detection and visible light is used for pointed position detection.

Figure 9:
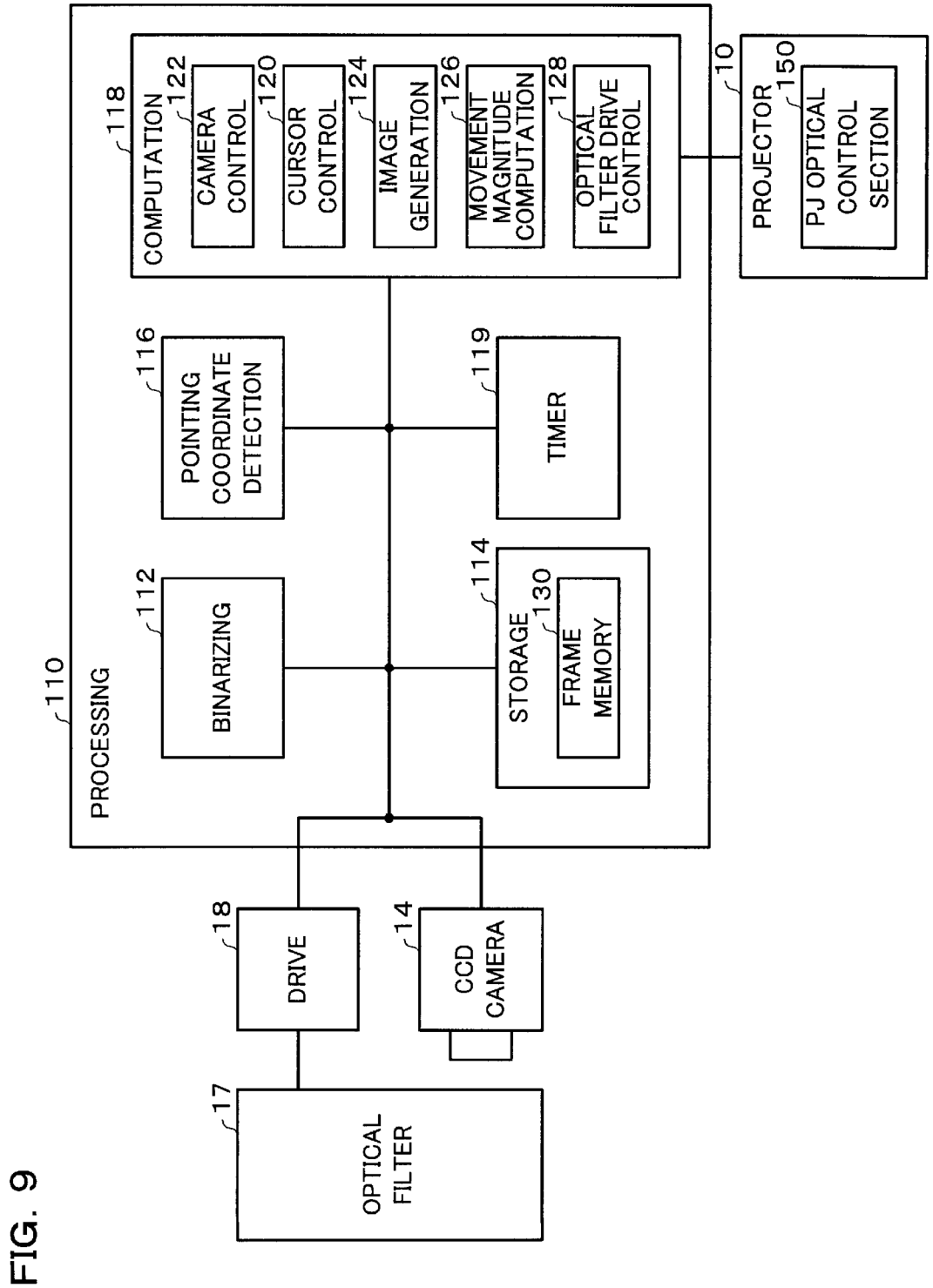
FIG. 9 is a functional block diagram of a system in accordance with another example of this embodiment of the present invention.

A functional block diagram of a system in accordance with another example of this embodiment of the present invention is shown in FIG. 9.

In comparison with the system shown in FIG. 2, this system differs in comprising an optical filter 17 that is provided in a rotatable manner in front of the lens of the CCD camera 14, a drive section 18 for driving the optical filter 17, and an optical filter drive control section 128 which provides drive control for the drive section 18 and which is provided within the computation section 118.

Figure 10:
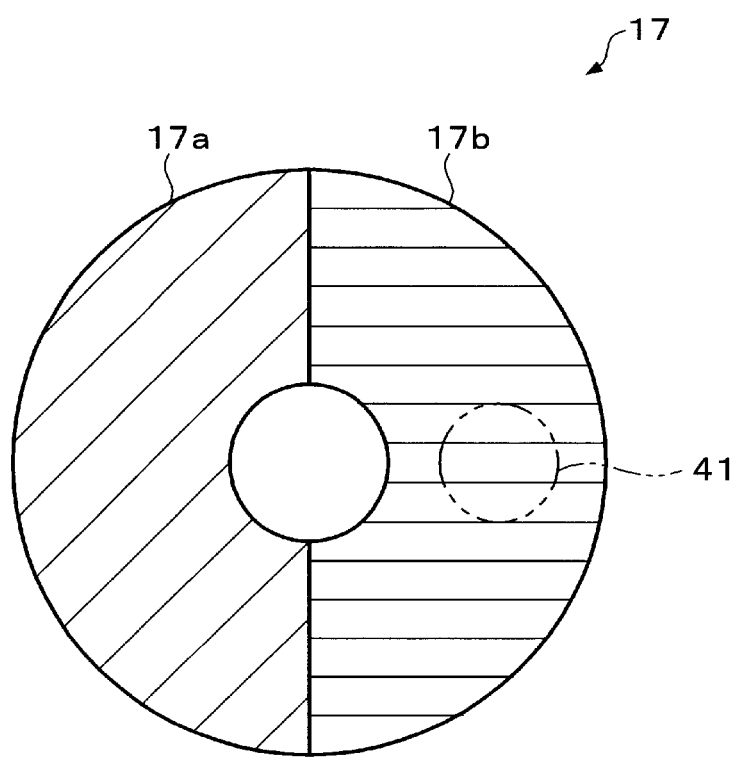
FIG. 10 is a schematic front view of an optical filter in accordance with an example of this embodiment of the invention.

A schematic front view of the optical filter 17 in accordance with an example of this embodiment of the present invention is shown in FIG. 10.

The optical filter 17 is formed in a circular shape where half of the circle is an optical filter 17a, which is an infrared transmission section that passes only infrared light, and the other half is an optical filter 17b which passes only visible light.

The description now turns to the flow of image capture processing used for detecting the pointed position when this system is used.

Figure 11:
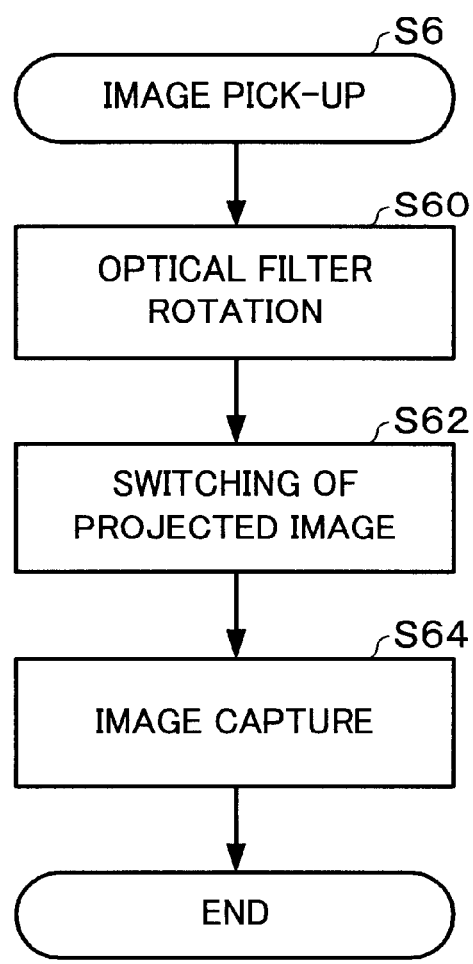
FIG. 11 is a flowchart of image capture processing in accordance with a further example of this embodiment of the present invention.

A flowchart of the image capture processing in accordance with a further example of this embodiment of the present invention is shown in FIG. 11.

First of all, the optical filter 17a is positioned in front of a lens 41 of the CCD camera 14 in order to detect movement, and movement of the pointer rod 40 is imaged by the CCD camera 14 in that state. The optical filter drive control section 128 controls the drive section 18 to rotate the optical filter 17 so that the optical filter 17b is placed in front of the lens 41 of the CCD camera 14 when movement of the pointer rod 40 is halted (step S60).

A completely white uniform image is then created by the image generation section 124 in the state in which the optical filter 17b is positioned in front of the lens 41 of the CCD camera 14, and that image is projected for an instant from the projector 10 towards the image display region 12 (step S62).

This projection of the uniform image for an instant ensures that the pointer rod 40 appears clearly in the image display region 12, and the CCD camera 14 takes the image in that state and the processing section 110 captures the image (step S64).

This ensures that no background intrudes into the thus-captured image and also that only the pointing image is shown, thus making it possible to detect the pointed position thereof accurately.

Note that, when this type of uniform image is projected, it is preferable to ensure that the PJ optical control section 150 of the projector 10 can adjust the brightness of the uniform image, based on the reflectivity of the image display region 12 and the sensitivity of the camera, which are transferred from the camera control section 122.

This makes it possible to project a uniform image at the optimal brightness to suit the environment in which the system is used, thus enabling a clear depiction of the pointer rod 40 in the image display region 12.

The description now turns to the hardware configuration used to implement the processing section 110 of the above described system.

Figure 12:
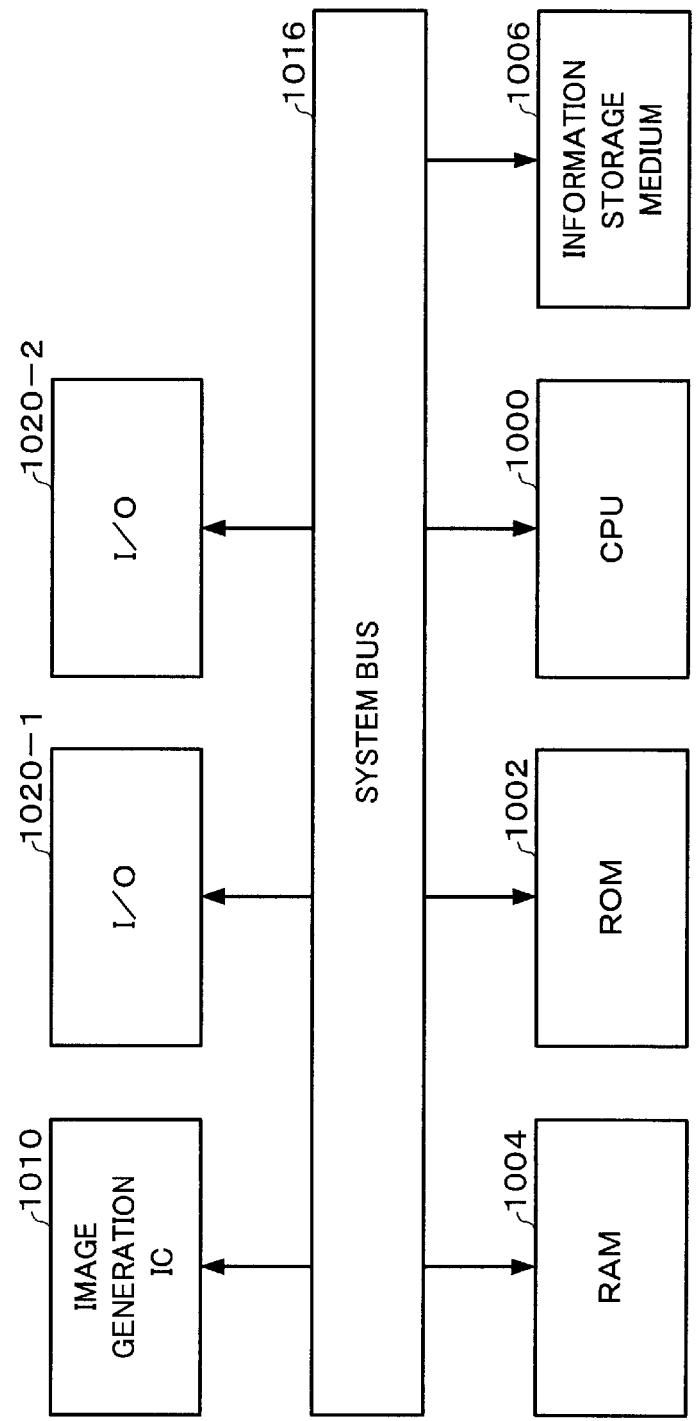
FIG. 12 is illustrative of the hardware configuration of the processing section in accordance with this embodiment of the present invention.

The hardware of the processing section 110 in accordance with an example of this embodiment of the invention is shown in FIG. 12.

In the device shown in this figure, a CPU 1000, ROM 1002, RAM 1004, an information storage medium 1006, an image generation IC 1010, and input-output (I/O) ports 1020-1 and 1020-2 are connected together by a system bus 1016 in such a manner that data can be mutually transferred therebetween. Components such as the CCD camera 14 and the projector 10 are connected to the I/O ports 1020-1 and 1020-2.

The information storage medium 1006 is used for storing a program and image data. Various means could be used as the information storage medium 1006, such as a CD-ROM, DVD-ROM, ROM, RAM, or hard disk.

The CPU 1000 controls the entire device and performs various types of data processing, in accordance with a program stored in the information storage medium 1006 and a program stored in the ROM 1002. The RAM 1004 is storage means that is used as a work area for the CPU 1000, and given contents for the information storage medium 1006 and the ROM 1002, as well as calculation results for the CPU 1000, are contained therein. A data structure having the logical configuration for implementing this embodiment of the present invention is constructed within the RAM 1002 or the information storage medium 1006.

The various processes described with reference to FIGS. 1 to 11 are implemented by the information storage medium 1006 that contains programs for performing those processes, together with components such as the CPU 1000 and the image generation IC 1010 that operate in accordance with those programs. Note that the processing performed by the image generation IC 1010 and other components could be implemented in a hardware manner by using circuitry or the like, or they could be implemented in a software manner by the CPU 1000 or an ordinary CPU.

It is also possible to implement the functions of the processing section 110 by downloading programs through a network from a host machine, instead of using the information storage medium 1006. In other words, a program for implementing this system on a computer could be embodied in a carrier wave.

Note that various other types of processing could be performed as the processing after the pointed position has been determined as described above, instead of the change of icon display or the activation of an application. For example, the size, color, or shape of the cursor that is displayed in the vicinity of the pointed position could be changed, or a sound could be played.

The present invention can also be applied to presentations and other performances that display an image by display means other than a projector means such as the above described projector. Such a display means corresponds to a wide range of display devices other than a liquid-crystal projector, such as a cathode ray tube (CRT), a plasma display panel (PDP), a field emission display (FED), an electroluminescence (EL) device, a direct-view type of liquid-crystal display device, or a digital micromirror device (DMD). Note that DMD is a trademark owned by Texas Instruments Incorporated.

In addition, although the embodiment of the present invention was described above as being applied to a front-projection type of projector, it can equally well be applied to a rear-projection type of projector.

It is also possible to employ means such as an infrared shutter that selectively passes infrared light and visible light according to its setting, instead of the optical filters 16 and 17. In addition, if images are to be formed by both infrared light and visible light, it is possible to provide two CCD cameras, where one CCD camera picks up an image formed by visible light and the other CCD camera picks up an image formed by infrared light, then perform the above described movement detection and position detection by selecting between the two types of picked-up image.

What is claimed is:

1. A pointed position detection system comprising:
   image pick-up means which picks up an image of an image display region; and
   position detection means which detects a position that is pointed by a pointing image within the image display region, based on image information obtained by the image pick-up means;
   wherein the position detection means comprises:
   movement detection means which detects movement of the pointing image; and
   pointed position detection means which detects the pointed position of the pointing image when movement of the pointing image has halted;
   wherein the image pick-up means includes adjusting means that adjusts exposure time such that an image is taken with a predetermined short exposure time during the detection of movement of the pointing image, but an image is taken with a long exposure time that is longer than the short exposure time during the detection of the pointed position of the pointing image.

2. The pointed position detection system as defined in claim 1, wherein:
   the image pick-up means picks up an infrared image of the image display region which is formed by infrared light;
   the movement detection means detects movement of the pointing image based on the infrared image formed by infrared light; and
   the pointed position detection means detects the pointed position of the pointing image based on the infrared image formed by infrared light.

3. The pointed position detection system as defined in claim 1, wherein:
   the image pick-up means picks up an infrared image of the image display region formed by infrared light and a visible-light image of the image display region formed by visible light;
   the movement detection means detects movement of the pointing image based on the infrared image formed by infrared light; and
   the pointed position detection means detects the pointed position of the pointing image based on the visible-light image formed by visible light.

4. The pointed position detection system as defined in claim 1, wherein:
   the image pick-up means picks up an infrared image of the image display region formed by infrared light and a visible-light image of the image display region formed by visible light;
   the movement detection means detects movement of the pointing image based on the visible-light image formed by visible light; and
   the pointed position detection means detects the pointed position of the pointing image based on the infrared image formed by infrared light.

5. The pointed position detection system as defined in claim 2,
   wherein the image pick-up means picks up an image formed by infrared light, through an infrared transmission section that allows only infrared light to pass.

6. The pointed position detection system as defined in claim 2, further comprising:
   an auxiliary light source which projects infrared light towards the image display region when picking up an image formed by infrared light.

7. The pointed position detection system as defined in claims 1, further comprising:
   projection means which projects light for forming a uniform image towards the image display region during the detection of the pointed position of the pointing image.

8. The pointed position detection system as defined in claim 1, further comprising:
   processing means which performs predetermined determination processing when a halt of movement of the pointing image is detected for at least a predetermined time, based on a detection result of the pointed position detection means.

9. A presentation system comprising:
   display means which displays an image in the image display region; and
   the pointed position detection system as defined in claim 1 to detect the pointed position of the pointing image.

10. A pointed position detection system comprising:
    image pick-up section which picks up an image of an image display region; and
    position detection section which detects a position that is pointed by a pointing image within the image display region, based on image information obtained by the image pick-up section;
    wherein the position detection section comprises:
    movement detection section which detects movement of the pointing image; and
    pointed position detection section which detects the pointed position of the pointing image when movement of the pointing image has halted;
    wherein the image pick-up means includes adjusting means that adjusts exposure time such that an image is taken with a predetermined short exposure time during the detection of movement of the pointing image, but an image is taken with a long exposure time that is longer than the short exposure time during the detection of the pointed position of the pointing image.

11. A computer-usable program for implementing a presentation system, embodied on an information storage medium or in a carrier wave, the program further implementing on a computer:
    means for causing image pick-up means to pick up an image of an image display region; and
    position detection means which detects a position that is pointed by a pointing image within the image display region, based on image information obtained by the image pick-up means;

adjusting means which adjusts exposure time of the image pick-up means such that an image is taken with a predetermined short exposure time during the detection of movement of the pointing image, but an image is taken with a long exposure time that is longer than the short exposure time during the detection of the pointed position of the pointing image;

wherein the position detection means comprises:

movement detection means which detects movement of the pointing image; and pointed position detection means which detects the pointed position of the pointing image when movement of the pointing image has halted.

12. The program as defined by claim 11, wherein:

the image pick-up means picks up an infrared image of the image display region which is formed by infrared light;

the movement detection means detects movement of the pointing image based on the infrared image formed by infrared light; and the pointed position detection means detects the pointed position of the pointing image based on the infrared image formed by infrared light.

13. The program as defined in claim 11, wherein:

the image pick-up means picks up an infrared image of the image display region formed by infrared light and a visible-light image of the image display region formed by visible light;

the movement detection means detects movement of the pointing image based on the infrared image formed by infrared light; and the pointed position detection means detects the pointed position of the pointing image based on the visible-light image formed by visible light.

14. The program as defined in claim 11, wherein:

the image pick-up means picks up an infrared image of the image display region formed by infrared light and a visible-light image of the image display region formed by visible light;

the movement detection means detects movement of the pointing image based on the visible-light image formed by visible light; and the pointed position detection means detects the pointed position of the pointing image based on the infrared image formed by infrared light.

15. The program as defined in claim 11, further implementing on a computer:

processing means which performs predetermined determination processing when a halt of movement of the pointing image is detected for at least a predetermined time, based on a detection result of the pointed position detection means.

16. A pointed position detection method comprising:

an image picking-up step of picking up an image of an image display region; and a position detection step of detecting a position that is pointed by a pointing image within the image display region, based on image information obtained in the image picking-up step;

wherein the image picking-up step includes adjusting exposure time such that an image is taken with a predetermined short exposure time during the detection of movement of the pointing image, but an image is taken with a long exposure time that is longer than the short exposure time during the detection of the pointed position of the pointing image;

wherein the position detection step comprises:

a step of detecting movement of the pointing image; and a step of detecting the pointed position of the pointing image when movement of the pointing image has halted.

* * * * *